United States Patent
Jungerman (10) Patent No.: US 9,660,576 B2
(45) Date of Patent: May 23, 2017

(54) PREDICTING PRODUCTION OF PHOTOVOLTAIC SYSTEMS

(71) Applicant: Solmetric Corporation, Lehi, UT (US)

(72) Inventor: Roger L. Jungerman, Petaluma, CA (US)

(73) Assignee: SOLMETRIC CORPORATION, Lehi, UT (US)

( * ) Notice: Subject to any disclaimer, the term of this patent is extended or adjusted under 35 U.S.C. 154(b) by 105 days.

(21) Appl. No.: 14/562,994

(22) Filed: Dec. 8, 2014

(65) Prior Publication Data

US 2015/0094969 A1   Apr. 2, 2015

Related U.S. Application Data

(63) Continuation-in-part of application No. 14/082,140, filed on Nov. 16, 2013, now abandoned, which is a continuation of application No. 12/799,951, filed on May 4, 2010, now Pat. No. 8,610,425.

(60) Provisional application No. 61/914,333, filed on Dec. 10, 2013, provisional application No. 61/943,175, filed on Feb. 21, 2014.

(51) Int. Cl.
*G01R 31/00* (2006.01)
*G01R 31/26* (2014.01)
*H02S 50/10* (2014.01)

(52) U.S. Cl.
CPC .................................. *H02S 50/10* (2014.12)

(58) Field of Classification Search
CPC .......................... G01R 31/003; G01R 31/2601
USPC ........................................................ 324/126
See application file for complete search history.

(56) References Cited

U.S. PATENT DOCUMENTS

| | | |
|---|---|---|
| 4,456,880 A | 6/1984 | Warner et al. |
| 4,779,980 A | 10/1988 | Hulstrom et al. |
| 4,873,480 A | 10/1989 | Lafferty |
| 6,278,954 B1 | 8/2001 | Lim et al. |
| 6,546,535 B1 | 4/2003 | Nagao et al. |
| 6,914,418 B2 | 7/2005 | Sung |
| 7,164,263 B2 | 1/2007 | Yakymyshyn et al. |

(Continued)

OTHER PUBLICATIONS

National Renewable Energy Laboratory, "How to Interpret Results in Legacy Calculators", http://www.nrel.gov/rredc/pvwatts/interpreting_results.html, Nov. 12, 2013.

(Continued)

*Primary Examiner* — Thomas Valone
(74) *Attorney, Agent, or Firm* — Maschoff Brennan (57) ABSTRACT

The present invention is directed to methods, systems, and devices for predicting production of a photovoltaic (PV) system. A method may include establishing a reference performance model for a reference PV system at a reference site. Further, the method may include establishing a performance factor for an installed PV system based on configuration parameters of the installed PV system, measurements of the installed PV system, weather data at an installation site of the installed PV system and a comparison of the measurements of the installed PV system to the reference performance model. The method may also include predicting production of the installed PV system based on the performance factor, cumulative weather data and a time dependent performance ratio.

5 Claims, 3 Drawing Sheets

(56) References Cited

U.S. PATENT DOCUMENTS

| | | | |
|---|---|---|---|
| 7,500,391 B2 | 3/2009 | Woro | |
| 7,580,817 B2 | 8/2009 | Bing | |
| 7,667,610 B2 | 2/2010 | Thompson | |
| 7,710,752 B2 | 5/2010 | West | |
| 7,742,897 B2 * | 6/2010 | Herzig | H02J 13/0062 702/182 |
| 7,832,267 B2 | 11/2010 | Woro | |
| 7,873,490 B2 | 1/2011 | MacDonald | |
| 7,925,552 B2 | 4/2011 | Tarbell et al. | |
| 8,004,117 B2 | 8/2011 | Adest et al. | |
| 8,165,812 B2 | 4/2012 | Hoff | |
| 8,178,999 B2 | 5/2012 | Burger et al. | |
| 8,212,399 B2 | 7/2012 | Besser et al. | |
| 8,249,902 B2 | 8/2012 | Arfin et al. | |
| 8,278,937 B2 | 10/2012 | Vasilyev et al. | |
| 8,295,989 B2 | 10/2012 | Rettger et al. | |
| 8,300,439 B2 | 10/2012 | Little et al. | |
| 8,326,535 B1 | 12/2012 | Hoff | |
| 8,334,972 B2 | 12/2012 | Thien | |
| 8,344,547 B2 | 1/2013 | Fife et al. | |
| 8,352,220 B2 | 1/2013 | Wayne et al. | |
| 8,386,179 B2 | 2/2013 | MacDonald | |
| 8,396,694 B2 | 3/2013 | Le Pivert | |
| 8,437,959 B2 | 5/2013 | Hoff | |
| 8,600,572 B2 | 12/2013 | Sri-Jayantha | |
| 8,610,425 B2 | 12/2013 | Jungerman et al. | |
| 2006/0225781 A1 | 10/2006 | Locher | |
| 2008/0162380 A1 | 7/2008 | Suga et al. | |
| 2009/0234692 A1 | 9/2009 | Powell et al. | |
| 2010/0217565 A1 | 8/2010 | Wayne et al. | |
| 2010/0217639 A1 | 8/2010 | Wayne et al. | |
| 2010/0217724 A1 | 8/2010 | Wayne et al. | |
| 2010/0318297 A1 | 12/2010 | Herzig et al. | |
| 2011/0276269 A1 | 11/2011 | Hummel | |
| 2011/0282514 A1 | 11/2011 | Ropp et al. | |
| 2012/0053867 A1 | 3/2012 | Dunn et al. | |
| 2012/0098669 A1 | 4/2012 | Lockwood et al. | |
| 2012/0112557 A1 | 5/2012 | Sager | |
| 2012/0154162 A1 | 6/2012 | Vandevelde et al. | |
| 2012/0155704 A1 | 6/2012 | Williams et al. | |
| 2012/0165963 A1 | 6/2012 | Kim et al. | |
| 2012/0166085 A1 | 6/2012 | Gevorkian | |
| 2012/0223733 A1 | 9/2012 | Gunawan et al. | |
| 2012/0299387 A1 | 11/2012 | Izadian | |
| 2012/0310427 A1 | 12/2012 | Williams et al. | |
| 2013/0061198 A1 | 3/2013 | Brier et al. | |
| 2013/0085729 A1 | 4/2013 | Tsuruta et al. | |
| 2013/0088252 A1 | 4/2013 | Brabetz et al. | |
| 2013/0158954 A1 | 6/2013 | Wayne et al. | |
| 2013/0159064 A1 | 6/2013 | Fisher et al. | |
| 2013/0200919 A1 | 8/2013 | Fokkelman et al. | |
| 2013/0241495 A1 | 9/2013 | Min | |
| 2013/0246010 A1 | 9/2013 | Dershowitz et al. | |
| 2013/0262049 A1 | 10/2013 | Zhang et al. | |
| 2013/0314599 A1 | 11/2013 | Kikugawa | |
| 2015/0012258 A1 * | 1/2015 | Caine | G06F 17/5009 703/18 |

OTHER PUBLICATIONS

Clean Power Research, "Solar Anywhere Data: Reduce Solar Resource Risk with Trusted Irradiance Data", http://www.cleanpower.com/products/solaranywhere/solaranywhere-data/,Nov. 13, 2013, Nov. 13, 2013.

King, et al., "Dark current-voltage measurements on photovoltaic modules as a diagnostic or manufacturing tool", 26th IEEE Photovoltaic Specialists Conference, Sep. 29-Oct. 3, 1997, Anaheim, California, 1997.

King, et al., "Photovoltaic Array Performance Model", Sandia National Laboratories Report, SAND2004-3535, Aug. 2000.

Liu, et al., "The Interrelationship and Characteristic Distribution of Direct, Diffuse and Total Solar Radiaion", Solar Energy, 1960, 4(3):1-19, 1-19.

Bill Marion, "Overview of the PV Module Model in PVWatts", Performance Modeling Workshop Presentation Albuquerque, New Mexico, Sep. 22, 2010, NREI/PR-520-49607, Sep. 22, 2010.

Perez, et al., "The Development and Verification of the Perex Diffuse Radiation Model", Contractor Report, SAND88-7030, Oct. 1988.

Skoczek, et al., "The Results of Performance Measurements of Field-aged Crystalline Silicon Photovoltaic Modules", Progress in Photovoltaics: Research and Applications; vol. 17, Issue 4, pp. 227-240, Jun. 2009, 227-240.

* cited by examiner

PREDICTING PRODUCTION OF PHOTOVOLTAIC SYSTEMS

A claim for the benefit of priority to the Dec. 10, 2013 filing date of U.S. Provisional Patent Application 61/914,333, titled PREDICTING PRODUCTION OF PHOTOVOLTAIC SYSTEMS ("the '333 Provisional Application"), is hereby made pursuant to 35 U.S.C. §119(e). In addition, a claim for the benefit of priority to the Feb. 21, 2014 filing date of U.S. Provisional Patent Application 61/943,175, titled PREDICTING PRODUCTION OF PHOTOVOLTAIC SYSTEMS ("the '175 Provisional Application"), is hereby made pursuant to 35 U.S.C. §119(e). Further, this application is a continuation-in-part of pending U.S. patent application Ser. No. 14/082,140, filed Nov. 16, 2013 and titled SOLAR MONITOR FOR SOLAR DEVICE ("the '140 application"), in which a claim for the benefit of priority is made to the May 4, 2010 filing date of U.S. patent application Ser. No. 12/799,951 (now issued U.S. Pat. No. 8,610,425), titled SOLAR MONITOR FOR SOLAR DEVICE ("the '951 application"). The entire disclosures of the '333 Provisional Application, the '175 Provisional Application, the '140 application and the '951 application are, by this reference, incorporated herein.

BACKGROUND

Deployment of solar photovoltaic (PV) systems is accelerating as the costs of PV panels and other components decrease. Solar PV system installations are further encouraged by various state and federal tax and depreciation credits. To avoid relatively large up-front installation costs, customers deploying a PV system may finance or lease the PV system. To increase the pool of investment capital available for financing or leasing the PV systems, solar leases may be securitized and sold to investors who may be interested in the tax advantages or financial benefits derived from the on-going electrical production provided by the PV systems.

When the electrical production of PV systems is securitized, the value and risk associated with resulting solar backed securities hinges on the accuracy with which the long-term electrical production of the PV systems can be predicted. Predicting the electrical production of PV systems is a complicated task, especially when the electrical production is provided by multiple PV systems at a variety of locations. Variations in the tilt and orientation of the PV panels, or "modules" in the various PV systems, variations in the fraction of direct and diffuse components in the incident solar radiation, spectral effects in the incident solar radiation and the response of the modules in the PV systems to the spectral effects each contribute to irradiance errors. The irradiance errors, when not accounted for, degrade the accuracy of the predicted electrical production of the PV systems. Temperature variations also contribute to errors in the predicted electrical production. The temperature of the cells within the modules depends on multiple factors, such as the ambient air temperature at each PV system, the wind speed, and the incident solar radiation. In addition, the weather data used in predicting electrical production of the PV systems may be provided by weather stations that may be relatively far from the installation sites, which may make it difficult to determine the solar irradiance and the temperature of the cells within the various PV systems.

In addition, there is some fractional loss in electrical production each year due to aging of the modules in the PV systems. Since PV systems may operate for 25 years or more, even very small aging rates (of a fraction of a percent per year) significantly impact the long-term electrical production from the PV systems both in later years, and when viewed cumulatively, over the life of the system. A solar backed security may be sold after approximately 5 years, when depreciation tax credits are exhausted. Because aging effects are typically very small in the first few years of operation of a PV system, it is difficult to accurately determine the aging rate based on this relatively short time period before a PV system may be securitized and sold, especially in view of the other sources of error in predicting electrical production of the PV system stated above. Other impairments, such as soiling and shading of modules, influence the electrical production of the PV systems. Unless accounted for, these impairments may further degrade the accuracy in the predictions of electrical production.

Predicting the electrical production of a PV system is further constrained by significant pressure to reduce costs in PV systems in terms of dollars per Watt of electrical production. Cost pressures may prohibit inclusion of weather monitoring equipment or other monitoring equipment or services that add to the installation costs or operating costs of a PV system. This is especially true of residential PV systems, which are smaller and provide relatively low revenue from electrical production. In residential PV systems, monitoring of electrical production is typically limited to an AC power meter. Hence there is a need for a low-cost method of accurately estimating the long-term PV electrical production.

Known techniques employed in software such as PVWATTS and disclosed by Bill Marion, "Overview of the PV Module Model in PVWatts" [PV Performance Modeling Workshop Albuquerque, N. Mex. Sep. 22, 2010 NREL/PR-520-49607] rely on Typical Meteorological Year (TMY) data to establish solar irradiance, ambient temperature, and wind speed to model the electrical production of a PV system. The model also uses configuration data for a PV system that includes the number of modules, the type of modules, the orientation (tilt and azimuth) of the modules as well as the location of the PV system. Temperature coefficients and other electrical performance parameters used in the model are typically derived from module-specific datasheets. Fixed derating may be relied upon to account for reductions in efficiency of the PV systems due to shading, mismatch of modules, low irradiance illumination production, inverter efficiency, soiling, and aging.

The TMY data provided by a weather station that is nearest to a PV system may still be as far as, for example, 10 km away from the location of the PV system being modeled. The configuration data, typically provided by datasheets, and fixed derating are both approximations to actual performance of the PV system. These factors in sum may provide variability of up to 20% between the predicted AC power output by the PV system and the annual output that is actually measured by an AC power meter [National Renewable Energy Laboratory, http://www.nrel.gov/rredc/pvwatts/interpreting_results.html Nov. 12, 2013].

Some averaging of weather related errors year-to-year may reduce the long-term uncertainty. However, local meteorological conditions not captured by the TMY data are not remedied by averaging. In addition, for a solar backed security that is sold after approximately 5 years, variability in the running average irradiance over 5 years is still approximately 2-3% year-to-year, and the error in the long-term production estimates in PVWATTS using standard derating is closer to 10-12%.

This type of modeling may not predict electrical production of PV systems with the accuracy needed for securitizing electrical production of PV systems. Accordingly, there is a need to predict electrical production with an accuracy that is closer to that of other financial instruments (typically 1% or better). While it may not be possible to achieve this level of accuracy for solar backed securities, improvements in the estimates of electrical production that approach these values may make solar-backed securities attractive to the financial community and may provide the needed capital to increase the pool of investment capital available for financing or leasing the PV systems.

DETAILED DESCRIPTION OF THE EMBODIMENTS

Figure 1:
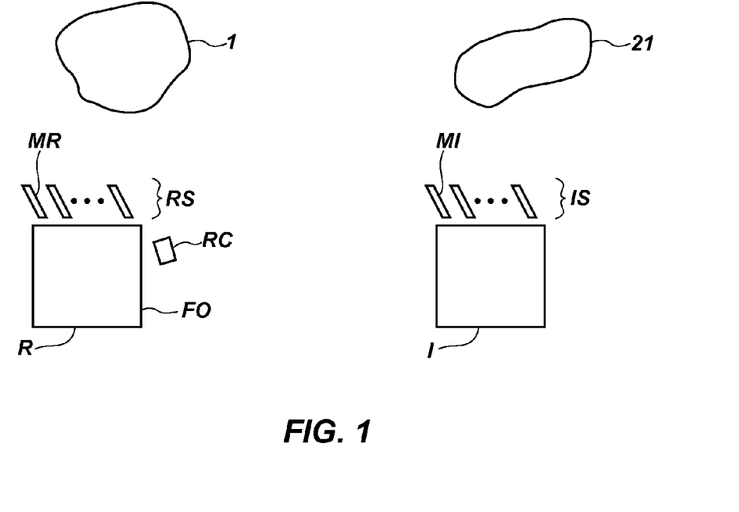
FIG. 1 shows an example configuration of a reference PV system and an installed PV system used to predict performance of the installed PV system according to embodiments of the present invention.

Commercial providers of solar PV systems may have field offices FO to facilitate the sale, installation, and maintenance of installed PV systems IS in the particular geographic markets that the providers serve. According to embodiments of the present invention, measurements at a reference PV system RS (shown in FIG. 1) located at the field office FO are used to estimate or predict the electrical energy production, or "electrical production" for a portfolio of one or more installed PV systems IS at different geographic locations, or installation sites I, that are serviced by that field office FO. FIG. 1 shows one representative installed PV system IS that may be included in such a portfolio.

To simplify installation procedures, maintenance and warranty issues, and to capitalize on volume discounts for the modules MI and other components included in the installed PV systems IS, the commercial providers typically limit the types of modules MI and inverters (not shown) that are included in the installed PV systems IS. In addition, the roof construction, roof pitch and similar latitudes of the installation sites of the installed PV systems IS may enable a similar mounting technique and orientation for the modules MI in each of the multiple installed PV systems IS. This commonality among the installed PV systems IS also enables a similar mounting technique and orientation to be used for the modules MR that are included in the reference PV system RS at the location R of the field office FO. According to embodiments of the present invention, the reference PV system RS provides a basis to accurately predict electrical production of the portfolio of installed PV systems IS. Due to cost constraints, monitoring electrical production is typically limited to measurements that can be acquired by an AC power meter when the installed PV systems IS in the portfolio are residential. Accordingly, AC power is typically the measure of the electrical production that is typically predicted to securitize the long-term electrical production of the installed PV systems IS.

The geographic reach of each field office FO may be large enough for localized microclimates to cause differences in the weather at various installation sites I (of the installed PV systems IS), relative to the weather that is measured at the field office FO. Satellite weather data is available, often with a resolution of 1 km [Clean Power Research, Napa Calif. Solar Anywhere. http://www.cleanpower.com/products/solaranywhere/solaranywhere-data/ Nov. 13, 2013]. This data is suitable to characterize differences between various microclimates and to enable correction for such differences between the weather at the various installation sites I of the installed PV systems IS and the weather at the location R of the reference PV system RS at the field office FO.

Figure 2A:
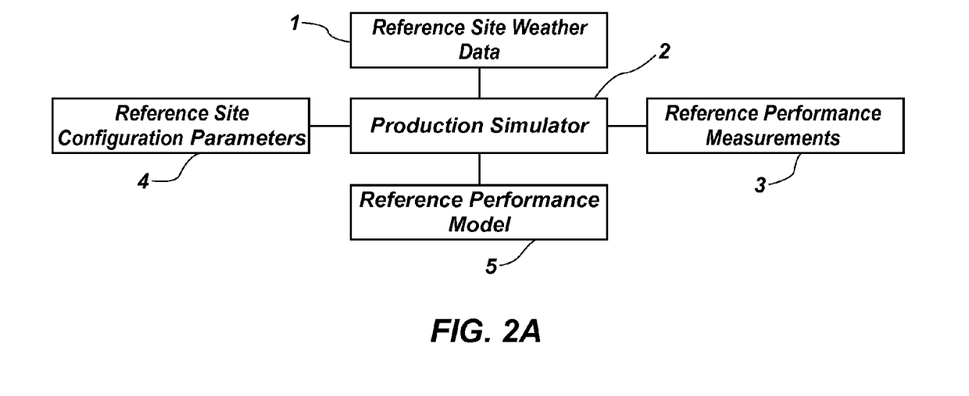
FIG. 2A shows an example derivation of a reference performance model included in the system for predicting production of PV systems according to embodiments of the present invention.

FIG. 2A shows an example derivation of a reference performance model 5 for the reference PV system RS. Reference site configuration parameters 4 are provided to a production simulator 2. Reference site weather data 1 for designated time periods is also provided to the production simulator 2. For those time periods, reference performance measurements 3 of the reference PV system RS, typically including at least one of current-voltage (IV) curves or AC power production or backside temperature of the reference PV system RS, are processed by the production simulator 2 to provide a reference performance model 5.

To acquire the reference performance measurements 3, the modules MR in the reference PV system RS at the field office FO are kept clean and are typically positioned in an unshaded location R. Alternatively, if there is shading of the modules MR in the reference PV system RS, that shading may be quantified using instruments such as a SUNEYE provided by SOLMETRIC CORP. of Sebastopol, Calif., techniques disclosed in U.S. Pat. No. 7,873,490 and U.S. Pat. No. 8,386,179 (these patents are titled Solar Access Measurement Device, and the entire contents of these patents are hereby incorporated by reference), or any other suitable devices, methods or systems to accommodate for the effects of the shading on the resulting reference performance measurements 3. In one example, where the reference performance measurements 3 include both IV curve data and AC production data for the reference PV system RS, the data is typically monitored and stored for various representative known times of the day and at representative weather conditions.

In some cases, the IV curves (which can be understood to mean portions of an IV curve or related data) or related data comprising at least a portion of reference performance measurements 3 may be obtained from an IV monitor that can periodically perform the measurements without significantly disrupting the reference PV system RV operation. Such a monitor is described in U.S. patent application Ser. No. 12/799,951, U.S. Pat. No. 8,610,425 titled Solar Monitor for Solar Device, the entire contents of which are hereby incorporated herein by reference. In other examples, IV curves (or portions of an IV curve or related data) can be obtained by varying the operating voltage point of a per module maximum power point tracker (MPPT) or a per module DC to AC power converter, also called a microinverter. For example, the Replus-250 microinverter (ReneSola, San Francisco, Calif.) can measure and report the open circuit voltage, Voc, and the short circuit current, Isc, measured at a voltage of 0V, together with the maximum power point voltage, Vmp, and current, Imp. These provide the three critical points of the IV curve that are typically used to estimate and model the output of a PV system. DC power optimizers provide another way of performing per module MPPT. In a similar way, DC-DC power optimizers can vary their MMPT operating point and measure the current voltage characteristics of each module. Finally, multiple PV modules can be connected in series, or in a "string". A string of modules produces a higher DC voltage that may be converted to AC using a high voltage string inverter. Sting inverters like the SMA 4000TL (SMA America, Rocklin, Calif.) have Global peak MPPT detection which can vary the operating voltage across the full string operating voltage range from 0V to the open circuit voltage, Voc of the full string, typically near ~500V. The IV characteristics of this string of modules MR at the reference site can be modeled using the reference site weather data 1 and compared to the inverter IV measurement to refine the model of the string system at the reference site. IV monitoring can include any one or more of the monitoring or data extraction or measurement devices described above that are capable of obtaining IV curves or related data, including shunt monitors, microinverters, power optimizers, string inverters, used alone or in combination. Such IV monitoring devices can be included as part of a basic installation of modules, including modules MI and/or MR (see FIG. 1), or added at any time thereafter.

The reference site configuration parameters 4 for the reference PV system RS at the location R typically include the latitude of the location R designated as "lat_r", the longitude designated as "long_r", the array tilt of the modules MR designated as "tilt_r", and azimuth designated as "azimuth_r", as well as the number and the type of modules MR that are included in the reference PV system RS.

The reference site weather data 1, when provided by a satellite weather source, typically has a 30 minute temporal resolution and 1 km spatial resolution and may be selected based on the known location R, i.e. latitude, lat_r, and longitude, long_r of the reference PV system RS. For each time period that reference performance measurements 3 are performed, the reference site weather data 1 typically provides the Global Horizontal Irradiance, (GHI(lat_r, long_r, time)), Diffuse Irradiance, (D(lat_r, long_r, time)), ambient air temperature (Ta(lat_r, long_r, time)), and wind speed (Wind(lat_r, long_r, time)).

Sun position calculators, such as SOLPOS available as software titled SOLPOS.C and distributed by the National Renewable Energy Laboratory may be included in the production simulator 2 to determine the angle of the sun, which may include the angle of incidence (AOI_r(lat_r, long_r, time, tilt_r, azimuth_r)), solar elevation angle (sun_elev_r(lat_r, long_r, time)), and solar azimuth (azimuth_r(lat_r,long_r,time)) at the location R of the reference PV system RS and at the time of the reference performance measurements 3.

The methods disclosed by Liu and Jordan, in Liu BYH, Jordan R C. *The inter-relationship and characteristic distribution of direct, diffuse and total solar radiation.* Solar Energy 1960; 4(3):1-19 may also be included in the production simulator 2 to evaluate the irradiance on the tilted plane, G_tilt_r, of the modules MR in the reference PV system RS (shown in equation 1). The reflectance of the ground at the location R around the field office FO, designated as the albedo (alb), influences the irradiance G_tilt_r and may be set to have a default value of albedo, alb=0.2. In alternative examples, the performance simulator 2 more accurately accommodates for diffuse irradiance and albedo at the location R using reference performance measurements 3 that include techniques described in US published patent application US2013/0314699 A1, titled Solar Resource Measurement System.

$$G\_tilt\_r = (GHI - D) * \cos(AOI\_r)/\sin(sun\_elev\_r) + D * (1 + \cos(tilt\_r))/2 + GHI * alb * (1 - \cos(tilt\_r))/2 \qquad 1)$$

A calculated temperature Tm of the backside of the modules MR in the reference PV system RS may be determined by the production simulator 2 according to equation 2, using a method disclosed in D. King, W. Boyson, J. Kratochvil, *Photovoltaic Array Performance Model,* Sandia National Laboratories Report, SAND2004-3535, August 2000.

$$Tm = G\_tilt\_r * \exp(a + b * Wind) + Ta \qquad 2)$$

where a and b are empirically determined coefficients, and where Wind is the wind speed in m/s and where Ta is the ambient temperature, both provided by the reference site weather data 1. In a typical example where the modules MR are glass and installed in a close roof mount, a=−2.98 and b=−0.0471. The cell temperature Tc of the module MR may also be determined using the method disclosed by King in the production simulator 2 according to equation 3:

$$Tc = Tm + dT * G\_tilt\_r/1000 \qquad 3)$$

where G_tilt_r is expressed in Watts/m$^2$ and dT is an empirically determined constant typically equal to 3 degrees C.

The reference performance measurements 3 may alternatively include a measurement of the backside temperature T_tc of the reference module MR, acquired directly with a thermocouple under typical operating conditions of the reference PV system RS. The production simulator 2 may then use the thermocouple measurement T_tc to estimate the cell temperature T_tc_m of the module MR according to equation 4.

$$T\_tc\_m = T\_tc + dT * G\_tilt\_r/1000 \qquad 4)$$

Alternatively, the cell temperature T_tc_m of the module MR may be derived by the production simulator 2 from the IV curves included in the reference performance measurements 3 using commercially available software packages, such as PV ANALYZER provided by SOLMETRIC CORP. of Sebastopol, California, or using other suitable techniques.

An AC power-weighted temperature offset T_off representing a difference between the cell temperature T_tc_m from the thermocouple measurement T_tc and the cell temperature Tc from the reference site weather data 1 as provided above, is evaluated in the production simulator 2 according to equation 5:

$$T\_off = Sum((T\_tc\_m - Tc) * P\_AC)/Sum(P\_AC) \qquad 5)$$

where P_AC is the AC power produced by the reference PV system RS and included in the reference performance measurements 3 by an AC power meter during a designated time period and where the Sum is evaluated within the same time period.

In an example where the reference performance measurements 3 include IV curves taken with a curve tracer, short circuit current Isc, maximum power voltage Vmp, and maximum power current Imp may be acquired at representative times, for example, throughout a year. Based on these reference performance measurements 3, the production simulator 2 determines the maximum power Pmp based on the relationship Pmp=Imp * Vmp.

Both the temperature coefficient of the maximum power Pmp, designated gamma_Pmp, and the maximum power at Standard Temperature Conditions (STC), designated as Pmp0, may have a significant impact on the reference performance model 5 that is provided by the production simulator 2. The temperature coefficient gamma_Pmp may be evaluated at selected times on clear days throughout the year that represent a range of ambient temperatures Ta. In one example, the temperature coefficient gamma_Pmp may also be evaluated at times of day wherein the short circuit current Isc, measured as part of the reference performance measurements 3, is greater than 70% of the maximum value of the short circuit current Isc for that day to insure sufficiently high irradiance at the modules MR. A normalized ratio Pmp_ratio that depends on temperature may be normalized for changes in irradiance in the tilted plane G_tilt_r of the module MR, as represented by short circuit current Isc, to obtain a consistent measure of gamma_Pmp. The maximum power Pmp may be normalized for the irradiance variations by dividing by the short circuit current Isc, as translated to a fixed temperature of 25 degrees C. The temperature coefficient of the short circuit current Isc is alpha_Isc. The temperature coefficient alpha_Isc may be obtained from a datasheet for the module MR and then included or otherwise provided as a reference site configuration parameter 4 to the production simulator 2. The temperature coefficient alpha_Isc may be used to calculate the dependence of short circuit current Isc on temperature in the reference performance model 5. This normalized maximum power designated as Pmp_ratio is plotted as a function of cell temperature Tc_tc_m. A linear regression is performed by the production simulator 2, and the slope of the linear fit is mp and the value of the linear fit at T_tc_m=25 degrees C. is bp. Equation 6 shows an example calculation of the normalized maximum power Pmp_ratio.

$$\text{Pmp\_ratio} = \text{Pmp}^*(1+\text{alpha\_Isc}^*(T\_tc\_m-25))/\text{Isc} \qquad (6)$$

Equation 7 describes how the temperature coefficient of maximum power gamma_Pmp is determined from the results of the linear regression of the normalized maximum power Pmp_ratio detailed above:

$$\text{gamma\_Pmp}=\text{mp/bp, which is typically expressed in \%/degree C.} \qquad (7)$$

Accurate determination of aging rates may also be important to accurately predict the long-term electrical production of the reference PV system RS as part of the reference performance model 5. The IV curve acquired in the reference performance measurements 3 provides a fill factor, which is a measure of the shape of the IV curve. According to *The results of performance measurements of field-aged crystalline silicon photovoltaic modules*, Artur Skoczek, Tony Sample, Ewan D. Dunlop Progress; Photovoltaics: Research and Applications, Volume 17, Issue 4, pages 227-240, June 2009, hereinafter "Skoczek", approximately ⅔ of aging of modules MR is attributed to changes in the shape of the IV curve. Measurements of the IV curves of reference module MR are taken as a part of the reference performance measurements 3 as a function of time y. Measurements are typically taken annually at similar irradiance and temperature conditions and may provide a normalized fill factor that is a repeatable and accurate measure of the fill factor aging rate ff_age, and which constitutes the majority of the overall aging rate. The fill factor aging rate ff_age may be determined by the production simulator 2 from a linear regression of a maximum power aging ratio Pmp_age_ratio for multiple times y according to equation 8:

$$\text{Pmp\_age\_ratio}=(\text{Pmp}^*(1+\text{alpha\_Isc}^*(T\_tc\_m-25))/ \\ (\text{Isc}^*(1+\text{gamma\_Pmp}^* (T\_tc\_m-25)) \qquad 8)$$

The maximum power aging ratio Pmp_age_ratio may be plotted as a function of time y, which typically runs from the time of installation of the reference PV system RS. The intercept is designated by mpa and the slope is designated by bpa. The fill factor aging rate, ff_age, is given by:

$$\text{ff\_age}=\text{bpa/mpa} \qquad 9)$$

and is typically expressed in % per year.

The Skoczek reference also approximates that ⅓ of the aging of modules MR is attributed to aging in the short circuit current Isc and is shown in equation 11 below. The aging in the short circuit current Isc of reference module MR, designated Isc_age, may result from delamination of coatings, pitting of the glass surface, or other factors that reduce the electrical performance of the modules MR with age. The aging in the short circuit current Isc_age may be evaluated by comparing the ratio of the measured short circuit current Isc from an IV curve of the reference module MR with the short circuit current Isc_ref_cell of a matched reference cell RC. The reference cell RC (shown in FIG. 1) is placed at the same orientation as the module MR, and is of similar physical construction to the modules MR included in the reference PV system RS. However, the reference cell RC is typically smaller than module MR so that it may be stored indoors in a controlled environment when not in use. The reference cell RC may also be recalibrated periodically in a standards laboratory. The reference cell RC may also be cleaned to eliminate any soiling before each use, so that the performance characteristics of the reference cell RC are independent of soiling. The reference cell RC is assumed to provide a constant short circuit current response that is independent of aging. Nearly simultaneous measurements of the short circuit current Isc ref cell of the reference cell RC and the short circuit current Isc of module MR reduce errors due to fluctuations in ambient irradiance that would otherwise influence the ratio of these short circuit currents used to determine aging. The backside temperatures of the reference cell RC and the reference module MR are typically measured with a thermocouple to correct the short circuit currents Isc and Isc_ref_cell for any temperature differences between the reference cell RC and the reference module MR.

The aging rate of the short circuit current Isc is part of the reference performance model 5. This aging rate may be determined by making approximately annual measurements of the short circuit current Isc within one hour of solar noon on a clear day at around the same time of year, typically in June, where conditions are most repeatable. The time may be chosen so that the angle of incidence AOI is relatively small to minimize the impact of angular misalignments between the module MR and the reference cell RC on the measured ratio of the short circuit currents Isc, Isc_ref_cell of the module MR and the reference cell RC, respectively. The temperature-corrected ratio of these short circuit currents, designated as Isc ratio is expressed in equation 10:

$$\text{Isc\_ratio}=\text{Isc/Isc\_ref\_cell}^*(1+\text{alpha\_Isc}^*(T\_\text{ref\_} \\ \text{cell}\_tc-T\_tc\_m)) \qquad 10)$$

In one example, for each date, the temperature-corrected short circuit current ratio Isc_ratio is averaged over a 2 hour interval. Then the averaged short circuit current ratio Isc_ratio is plotted as a function of the time since the installation of the reference PV system RS. The slope of the line evaluated from the linear regression is mi and the intercept at time t=0 (the installation date) is bi. Then the fractional aging rate of the short circuit current Isc, designated as Isc_age, is determined according to equation 11:

$$\text{Isc\_age} = mi/bi \text{ and is typically expressed in \% per year or as a fraction.} \quad (11)$$

The production simulator 2 uses multiple measurements of maximum power Pmp from IV curves acquired in the reference performance measurements 3 to determine the DC power output Pmp0 of the module MR at STC conditions according to equation 12:

$$\text{Pmp0} = \text{Average}(\text{Pmp}^2/((1+\text{gamma\_Pmp}*(Tc-25+T\_\text{off})*G\_\text{tilt}/1000))/\text{Average (Pmp)} \quad (12)$$

The Average function in equation 12 in one example is evaluated for data on the clear days throughout the year where irradiance fluctuations are small, and where the irradiance $G\_\text{tilt\_r} > 200 \text{ W/m}^2$.

The production simulator 2 also determines a power weighted average efficiency for the combination of inverter and the AC Power meter, designated as Inv_e according to equation 13:

$$\text{Inv\_e} = \text{Sum}(P\_AC)/\text{Sum(Pmp)} \quad (13)$$

Finally, the production simulator 2 provides the reference performance model 5 represented by an AC power P_AC_calc_ref (y) according to equation 14:

$$P\_AC\_\text{calc\_ref }(y) = \text{Inv\_e}*\text{Pmp0}*G\_\text{tilt}/1000*(1+\text{gamma\_Pmp}*(Tc+T\_\text{off}-25))*(1+(\textit{ff}\_\text{age}+\text{Isc\_age})*y)) \quad (14)$$

where y is the number of years since installation. In this example, the reference performance model 5 is represented by an AC power P_AC_calc_ref (y) provided at the output of an inverter within the reference PV system RS. In alternative examples, the reference performance model 5 is a measure of DC power or any other suitable representation of the electrical production of the reference PV system RS.

Figure 2B:
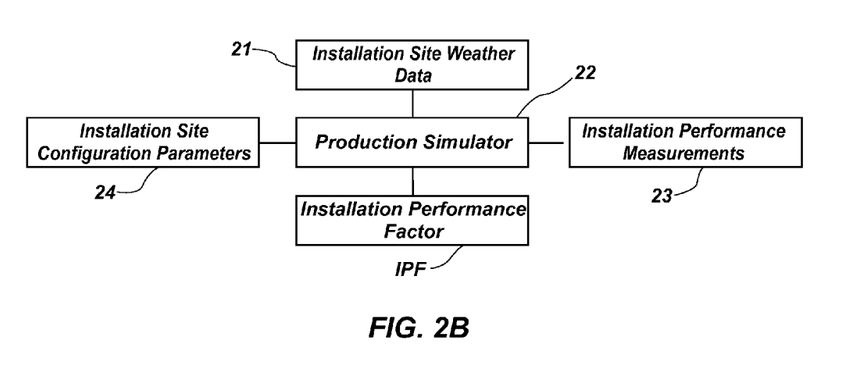
FIG. 2B shows an example derivation of an installation performance factor included in the system for predicting production of PV systems according to embodiments of the present invention.

FIG. 2B shows an example derivation of an installation performance factor IPF for an installed PV system IS at an installation site I. In FIG. 2B, installation site configuration parameters 24 are provided to a production simulator 22. Installation site weather data 21 for designated time periods is also provided to the production simulator 22. For the same time periods, installation performance measurements 23 of the installed PV system IS, typically including at least one of IV curves or AC power production of the installed PV system IS, are provided to the production simulator 22 to provide an installation performance factor IPF. Installation performance measurements 23 may be obtained in the same manner as described above with reference to reference performance measurements 3, including through IV monitoring using microinverters, power optimizers, or string inverters that are part of the installed PV system IS, or one or more modules MI that are part of such installed PV system IS.

For installation sites I that are residential, cost constraints may limit the installation performance measurements 23 to measurements of AC power production of the installed PV system IS. The impact of shading on the measured AC power production is accommodated by the production simulator 22. Shading accommodations may be based on site measurements and analysis of an installed PV system IS using instruments such as a SUNEYE provided by SOLMETRIC CORP. of Sebastopol, Calif., using techniques disclosed in U.S. Pat. Nos. 7,873,490 and 8,386,179, titled Solar Access Measurement Device, or using any other suitable devices, methods or systems to accommodate for the effects of the shading on the resulting installation performance measurements 23. The shade measurement and analysis may be included as part of the installation performance measurements 23 to indicate the AC power production that is lost due to shading, and may be used to indicate the presence of shading for a given sun direction of solar azimuth and solar elevation for designated time periods. On-site shade measurements are alternatively used to determine likely time periods during the day when shading may occur. Corresponding reductions in the AC power production measured in the installation performance measurements 23 for each time period specified in the installation site configuration parameters 24 where shading is likely may be determined. These reductions may be determined by measuring periodic daily AC power production during time periods with likely shading. The measured AC power production may be compared to a predicted AC power production by the production simulator 22 when a shading correction is not included to provide a shading percentage, or solar access for the installed PV system IS within a designated time period. Alternatively, an on-site shade measurement may provide a solar access percentage representing an average over all time intervals during the year, and this may be applied as a fixed ratio or multiplicative factor in the installation performance factor IPF.

Additional installation performance measurements 23 may accommodate for the albedo of the installation site I in the determination of an irradiance G_tilt_i in the tilted plane of the modules MI in a manner analogous to that of equation 1. In the determination of the irradiance G_tilt_i the installation site weather data 21 provides for a Global Horizontal Irradiance GHI, a Diffuse Irradiance D, an ambient air temperature Ta, and wind speed Wind that are each a function of the location of the installation site I provided by a lattitude lat_i and a longitude long_i and time.

An initial AC production P_AC0 of the installed PV system IS at the installation site I may be measured as part of the installation performance measurements 23 shortly after the installation of modules MI, before the installation site modules are soiled. Alternatively, the initial AC power production P_AC0 represents the AC power production of an existing installed PV system IS having a known installation date, so that aging may be determined, and having modules MI that are clean, so that the initial AC power production P_AC0 is not influenced by soiling. In yet another alternative, the initial AC power production P_AC0 represents the AC power production of an existing installed PV system IS having a known installation date and soiling that may be determined based on a soiling model. The production simulator 22 uses the measurement of initial AC power production P_AC0 to determine the installation performance factor IPF according to equation 15. The installation performance factor IPF scales the AC power production of the installed PV system IS to account for systematic differences in performance between the installed PV system IS and the reference PV system RS:

$$\text{IPF} = \text{Average}(P\_AC0/(\text{Inv\_e}*\text{Pmp0}*G\_\text{tilt\_i}/1000*(1+\text{gamma\_Pmp}*(Tc+T\_\text{off}-25))) \quad (15)$$

In equation 15, the AC power production P_AC0 may be evaluated at the installation site I over a short time interval dt on a clear day, near solar noon when the angle of incidence AOI on the modules MI is nearly perpendicular. The max power Pmp0 represents a determination of the DC power output Pmp0 of the module MR at STC conditions as established in equation 12 acquired over a same designated time period dt in which the AC power production P_AC0 is measured.

The power weighted average efficiency Inv_e, the temperature coefficient of maximum power gamma_Pmp, the DC power output Pmp0 at STC, and the AC power-weighted temperature offset T_off are from reference performance measurements 3 described in equations 13, 7, 12, and 5 respectively. The installation performance factor IPF in equation 15 is averaged over the same short time period dt as that for the Average that is specified in equation 12. These nearly simultaneous measurements of the reference PV system RS and installed PV system IS minimize errors due to systematic variability in satellite weather data in the installation site weather data 21 and the reference site weather data 1. Ideally the installation performance factor IPF specified in equation 15 is further measured over all clear days before the installation site modules MI are significantly soiled, to obtain a consistent IPF value.

The installation performance factor IPF factor accounts for variations in efficiencies of the module MI and inverters (not shown), albedo effects of the installation site I, or other systematic differences relative to the reference performance model 5 developed at the field office FO at reference site R. The installation performance factor IPF provides a comparison of the performance of the installed PV system IS and the reference PV system RS, taking into account the relative differences in the satellite weather data and orientation of the modules MR, MI at the reference site R and the installation site I, respectively. Thus, the installation performance factor IPF may be used to validate the proper operation of the installed PV system IS at the installation site I in the first few clear days after the installation is complete, as part of a commissioning process for the new PV system. If the installation performance factor IPF differs from an ideal value of unity by more than a designated threshold amount, the installation performance factor IPF may be used to indicate an installation site problem, or even a failure of a commissioning test for an installed PV system IS.

Figure 3:
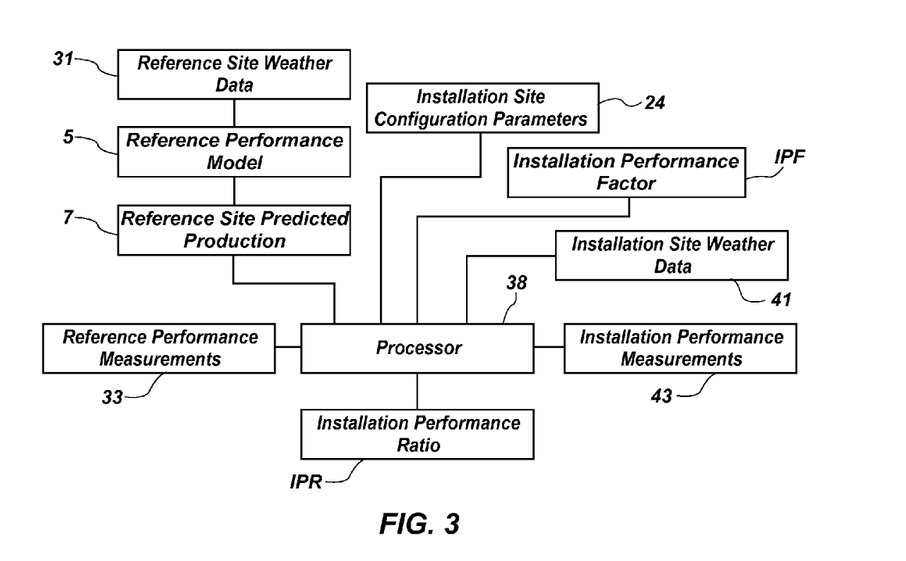
FIG. 3 shows an example derivation of an installation performance ratio included in the system for predicting production of PV systems according to embodiments of the present invention.

FIG. 3 shows an example derivation of an installation performance ratio IPR for the installed PV system IS. The installation performance ratio IPR may be determined by a processor 38 according to equation 16. Reference site weather data 31 for time y may be used by the reference performance model 5 to calculate the reference site predicted production 7, represented as P_AC_calc_ref(y) according to equation 14 and provided to processor 38. The reference performance measurement 33 for time y includes a measured AC power of the reference PV system RS for time y designated P_AC_meas_ref(y), which is also provided to processor 38. Installation site configuration parameters 24 and the installation performance factor IPF from equation 15 are also provided to processor 38. Installation site weather data 41 for time y and installation performance measurements 43 for time y consisting of the measured AC power at the installation site I for time y, designated P_AC_meas_ins(y) are also provided to processor 38. The installation performance ratio IPR may be calculated as a function of time y according to equation 16:

$$\text{IPR}(y) = P\_AC\_meas\_ins(y)/(IPF*Inv\_e*Pmp0(y)*G\_tilt\_i(y)/1000*(1+gamma\_Pmp*(Tc\_i(y)+T\_off-25))*(1+(ff\_age+Isc\_age)*y)) \quad 16)$$

In equation 16, the cell temperature Tc_i(y) of the modules MI may be determined using installation site weather data 41 for time y and installation site parameters 24 (shown in FIG. 2B) applied as in equation 3. The irradiance G_tilt_i(y) in the plane of the modules MI may be calculated using installation site weather data 41 and installation site configuration parameters 24 (shown in FIG. 2B) applied as in equation 1. The time y is a variable that represents the number of years since the installation of the installed PV system IS.

Aging of the modules MI in the installed PV system IS, represented in equation 16 as (ff_age+Isc_age) causes the AC power production P_AC_meas_ins(y) of the installed PV system IS to decrease with time y in a similar fashion to the aging accounted for in the reference performance model 5. Based on the similar types of modules MI at the installation site I and modules MR at the reference site R, the short circuit current aging Isc_age and fill factor aging ff_age in equation 16 are based on the aging shown in equations 11 and 9, respectively, and included as part of the reference performance model 5. In addition, the modules MI in the installed PV system IS at the installation site I are impacted by soiling, shading, and system component failures that may typically further reduce the AC power production P_AC_meas_ins(y) included in the installation performance measurements 23. To isolate the effects of soiling, shading, and component failures, the modules MR in the reference PV system RS at the reference site R are kept clean, unshaded and in good repair.

The effects of soiling, shading and system outage are captured in the installation performance ratio (IPR) shown in FIG. 3 and equation 16. The interpretation of the installation performance ratio IPR is given by:

$$\text{IPR}(y) = \text{Soil}(y)*SA(y)*\text{Uptime}(y) \quad 17)$$

where Soil(y), SA(y) and Uptime(y) are evaluated over the time period of interest. SA(y) represents the solar access, the fraction of total AC power production of the installed PV system IS as diminished by shading of the modules MI at the installation site I. Soil(y) represents the soiling of the modules MI and is the fraction of total AC power production of the installed PV system IS as diminished by soiling of the modules MI at the installation site I. Uptime(y) represents the fraction of total AC power production of the installed PV system IS as diminished by outages of inverters or other components of the installed PV systems IS.

With time, the modules MI at each installation site I may become soiled. The reference modules MR at the reference site R, by contrast, are maintained and kept clean, in good working order, and free of shade. Thus the term IPR(y) does not appear in equation 14 as part of the reference performance model 5. This cleaning of the modules MR at the reference site R may be relatively economical, since there may be technicians at the field office FO and since there are comparatively few modules MR at the field office FO compared to the multiple installed PV systems IS that are in the portfolio. As an alternative, automatic cleaning systems may be employed at the field office FO.

In the case of systems with per module IV monitoring capability (whether or not each module has such capability), additional insight into the model parameters at the installation site I may be provided by the IV data from modules MI at the installation site I. The effect of irradiance changes due to shading at the installation site I can be determined by comparing the individual module production, as measured by the short circuit current Isc from the IV curve. The short circuit current Isc of each shaded module Mi for each sun elevation angle and sun azimuth angle is compared to the short circuit current Isc of an unshaded module M0 at the installation site I (that has the same orientation of elevation and azimuth, and has the highest short circuit current Isc). In this way a module shading factor, MSF for each module, Mi, is obtained from $$\text{MSF}(Mi, \text{elevation}, \text{azimuth}) = \text{Isc}(Mi, \text{elevation}, \text{azimuth})/\text{Isc}(M0, \text{elevation}, \text{azimuth}) \quad (18)$$

If all of the modules MI at the installation site I are shaded, then the value of Isc(M0, elevation, azimuth) used in equation 18 can be obtained from another nearby site I, or from the field office FO that is guaranteed to be free of shade, but the short circuit current Isc values may need to be corrected for differing elevation or azimuth angles. If the modules MI are uniformly soiled, then the shading factor can still be extracted, since the soiling of modules Mi and M0 may be similar, since they are typically at the same installation site I. The average solar access of the installed PV system IS for time y, as appears in equation 17, is obtained from $$SA(y) = \text{Average}(\text{MSF}(Mi, \text{elevation}, \text{azimuth})) \quad (19)$$

where the average is performed over the time period of interest for all of the modules MI in the system. This average can then be evaluated for each month of the year and differences noted that may account for seasonal changes, such as the differences in shading when trees are in and out of leaf. This more detailed shading model can then be used for more accurate long-term energy production estimation.

The uptime Uptime(y) in equation 17 may be impacted by system outages, for example from the failure of microinverters, and may reduce the AC power production of the installed PV system IS. These failures may be determined from the installation performance ratio IPR when other system diagnostics are not available. Knowledge of the inverter outages along with system soiling data provided from the installation performance ratio IPR may be used to optimally schedule a truck-roll to clean and repair an installed PV system IS, given the cost of the service call and the anticipated improvement in the AC power production of the installed PV system IS after servicing.

A fixed estimate of the installation performance ratio IPR may be obtained by averaging over a long time interval, for example, one year. A power weighted average can be used to better estimate the average power production:

$$IPR = \text{Sum}((IPR(y))*P\_AC\_meas\_ins(y))/\text{Sum}(P\_AC(y)) \quad (20)$$

where P_AC_meas_ins(y) represents the measured AC output power as part of the installation performance measurements 43 at time y and IPR(y) is the installation performance ratio for that time period y calculated by the processor 38 according to equation 17. The fixed weighted average installation performance ratio IPR might, for example, approximate the average soiling loss of the installed PV system IS over a full year.

Figure 4:
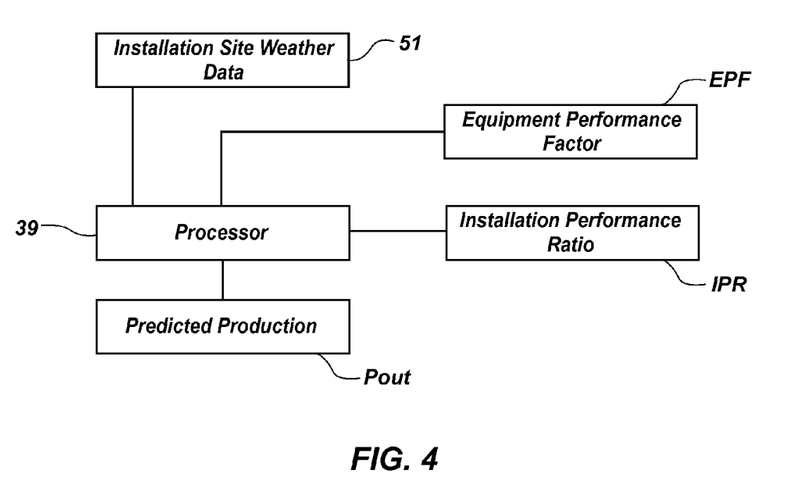
FIG. 4 shows an example system for predicting production of the installed PV system according to alternative embodiments of the present invention.

FIG. 4 shows an example where the installation performance ratio IPR is used to estimate or predict the electrical production, or "production" Pout of the installed PV system IS. Installation site weather data 51 is input into the processor 39. For the prediction of long-term production Pout, TMY weather data may be used. Alternatively long-term representations of weather, or other weather sources may provide the installation site weather data 51. The processor 39 uses the installation performance ratio IPR (determined in FIG. 3) and the installation performance factor IPF (derived in FIG. 2B) to calculate the predicted production Pout. The installation performance ratio IPR may be fixed as described in equation 20 or may vary as a function of time as shown in equation 17. In the example where the modules MR in the reference PV system RS are similar type to the modules MI in the installed PV system IS, aging rates at the installation site I are estimated to be the same as the aging rates established for the reference performance model 5. The processor 39 uses the installation performance ratio IPR(y) to predict the production Pout at the installation site I of the installed PV system IS according to the equation 21:

$$\text{Pout}(\text{installation site}, TMY, y) = \text{IPR}(y)*\text{IPF}*\text{Inv}\_e*\text{Pmp0}*G\_tilt\_i(y)*(1+\text{gamma\_Pmp}*(Tc\_i(y)+T\_off-25))*(1+(ff\_age+Isc\_age)*y) \quad (21)$$

In equation 21, the installation performance ratio IPR(y), which is typically time-varying, may alternatively be a fixed constant for as described for example in equation 20, where it is assumed that the installation performance factor IPR does not change as a function of time.

The soiling rate may vary according to the locations of the installation sites I of the various installed PV systems IS in the portfolio installed PV systems IS. For example, some modules MI may be at an installation site I that is in dusty conditions. Thus the installation performance ratio IPR provided to processor 39 for each installed PV system IS may be unique, based on the particular location of the installation site I for the installed PV system IS.

Soluble types of soiling may be cleaned by rain, while insoluble soiling may build up over time, reducing the AC power production of an installed PV system IS. In extreme cases, soiling could warrant additional cleaning of the modules MI, though cleaning in residential systems may be cost-prohibitive. If cleaning is considered, a more detailed soiling model that includes linear soiling rate, time since last rain, soiling grace period after rain, and insoluble soiling rate can be developed to determine the optimum cleaning schedule.

The preceding description is for an isotropic diffuse radiation model, constant soiling, a simple inverter and AC meter model, and a module electrical model using an irradiance independent fill factor. Satellite weather data is assumed, though other sources of weather data can also be used. Since multiple IV curves and AC power comparisons between a reference site R and the installation site I provide a wealth of information about the system, it is understood that other models can be used in the method described here. Possible model variants include anisotropic diffuse models such as that disclosed in *The Development and Verification of the Perez Diffuse Radiation Model*, Richard Perez, Ronald Stewart, Robert Seals, Ted Guertin [Contractor Report SAND88-7030 October 1988] and a module response that depends on angle of incidence as described by King, and soiling models that include soluble and insoluble soiling, soiling grace period, soiling rate, time since last rain, and the dependence of soiling loss on the angle of incidence, such as those described by Marion. While the reference module MR is typically cleaned, it can be left uncleaned if the soiling is small, or the soiling model is understood at the reference site R to sufficient precision to compensate for the reference PV system RS soiling. Electrical models can also include non-linear changes in PV module output power with irradiance and temperature like those described by King, and variations in the inverter conversion efficiency with power and voltage. A more detailed model can achieve higher accuracies, in some cases, if a sufficient history of performance measurements and weather data are taken under representative conditions to refine the parameters in the model.

In some examples, the IV curves acquired in the reference performance measurements 3 of FIG. 2A are of modules MR in a reference PV system RS that is at the same location as the installed PV system IS. This may give the best results and can be employed if modules MI or strings of modules MI at the installation site IS have IV output monitor capability. When the modules MR that are used to derive the reference performance model 5 at the reference site R are at a very nearby site or even the identical installation site I as the installed PV system IS, the correlation between the reference site modules MR and the installation site modules MI may be improved. The modules MR that are monitored in this example may be separate reference modules MR at the installation site I. In some cases, the IV curves may be obtained from modules MI that are part of the installed PV system IS itself. This requires an IV monitor that can periodically perform the measurements without significantly disrupting the PV system operation. Such a monitor is described in U.S. pat. No. 8,610,425, titled Solar Monitor for Solar Device, the entire contents of which are incorporated herein by reference. In other cases, this IV monitor capability can be provided by microinverters, power optimizers, or string inverters that are part of the installed PV system IS, and that have the capability of periodically performing IV curve measurements, as described above with reference to FIGS. 2A and 2B. In this case, significant additional cost for the IV monitoring function is avoided.

In the example embodiments of the present invention, the production simulator 2 in FIG. 2A, the production simulator 22 in FIG. 2B, the processor 38 in FIG. 3 and the processor 39 in FIG. 4 are shown as separate and distinct. Typically, the production simulators 2, 22, and processors 38, 39 are implemented in software, wherein the functions of the separate production simulators 2, 22, and processors 38, 39 are incorporated or consolidated into a single software package, device, element or system.

What is claimed is:

1. A method, comprising:
    establishing a reference performance model for a reference photovoltaic (PV) system at a reference site, wherein establishing the reference performance model comprises establishing the reference performance model including at least one of a fill factor aging component and a short circuit current aging component;
    establishing a performance factor for an installed PV system based on configuration parameters of the installed PV system, measurements of the installed PV system, weather data at an installation site of the installed PV system and a comparison of the measurements of the installed PV system to the reference performance model; and
    predicting production of the installed PV system based on the performance factor, cumulative weather data and a time dependent performance ratio, wherein the time dependent performance ratio is an anticipated aging rate of the installed PV system.

2. The method of claim 1, wherein establishing the reference performance model comprises establishing the reference performance model based on configuration parameters for the reference PV system, measurements of the reference PV system, and weather at the reference site and including at least one of a fill factor aging component and a short circuit current aging component.

3. The method of claim 1, wherein establishing the reference performance model comprises establishing the reference performance model including the short circuit current aging component established relative to a reference cell.

4. The method of claim 1, wherein establishing a performance factor comprises establishing the performance factor used to establish pass or fail status of a commissioning test, wherein the commissioning test determines whether the predicted production of the installed PV system is within a threshold amount of the reference PV system.

5. A system, comprising:
    at least one processor configured to:
        establish a reference performance model for a reference photovoltaic (PV) system at a reference site, wherein the reference PV system includes at least one PV module and a production simulator configured to generate the reference performance model in response to at least one of weather data at the reference site, configuration parameters at the reference site, and performance measurements of the reference PV system, wherein the reference PV system further includes a reference cell for providing a constant short circuit current response independent of aging;
        establish a performance factor for an installed PV system based on configuration parameters of the installed PV system, measurements of the installed PV system, weather data at an installation site of the installed PV system and a comparison of the measurements of the installed PV system to the reference performance model, wherein the installed PV system includes at least one PV module and a production simulator configured to generate the performance factor; and
        predict production of the installed PV system based on the performance factor, cumulative weather data (TMY) and a time dependent performance ratio, wherein the time dependent performance ratio is an anticipated aging rate of the installed PV system.

* * * * *